(12) United States Patent
Kim et al.

(10) Patent No.: US 8,135,997 B2
(45) Date of Patent: Mar. 13, 2012

(54) METHOD FOR OBSTRUCTION AND CAPACITY INFORMATION UNIFICATION MONITORING IN UNIFICATION MANAGEMENT SYSTEM ENVIRONMENT AND SYSTEM FOR THEREOF

(75) Inventors: Byung Seop Kim, Yongin-si (KR); Chi Hoon Lee, Suwon-si (KR); Cheol Ju Kang, Yongin-si (KR); Jae Hee Park, Busan (KR); Hyeon Min Han, Seoul (KR); Seong Hyon Nam, Busan (KR)

(73) Assignee: Samsung SDS Co., Ltd., Seoul (KR)

( * ) Notice: Subject to any disclaimer, the term of this patent is extended or adjusted under 35 U.S.C. 154(b) by 104 days.

(21) Appl. No.: 12/524,256

(22) PCT Filed: Apr. 11, 2007

(86) PCT No.: PCT/KR2007/001759
§ 371 (c)(1),
(2), (4) Date: Dec. 10, 2009

(87) PCT Pub. No.: WO2008/091038
PCT Pub. Date: Jul. 31, 2008

(65) Prior Publication Data
US 2010/0088552 A1     Apr. 8, 2010

(30) Foreign Application Priority Data
Jan. 26, 2007   (KR) .................. 10-2007-0008375

(51) Int. Cl.
*G06F 11/00* (2006.01)
(52) U.S. Cl. ........................... 714/47.1; 714/4.4; 714/48
(58) Field of Classification Search ........................ None
See application file for complete search history.

(56) References Cited

U.S. PATENT DOCUMENTS

| 6,170,067 | B1 * | 1/2001 | Liu et al. ......................... 714/48 |
| 6,658,453 | B1 | 12/2003 | Dattatri |
| 2007/0168874 | A1 * | 7/2007 | Kloeffer et al. ................ 715/764 |
| 2007/0283194 | A1 * | 12/2007 | Villella et al. ................... 714/57 |
| 2008/0126110 | A1 * | 5/2008 | Haeberle et al. .................. 705/1 |

FOREIGN PATENT DOCUMENTS

| JP | 2003216457 A | 7/2003 |
| KR | 1020000050248 A | 8/2000 |
| KR | 1020030049269 A | 6/2003 |
| KR | 1020030056301 A | 7/2003 |
| KR | 1020050059489 A | 6/2005 |

* cited by examiner

*Primary Examiner* — Michael Maskulinski
(74) *Attorney, Agent, or Firm* — The Webb Law Firm

(57) ABSTRACT

Provided are a method and system for integrated monitoring of fault and performance information in an integrated management system environment including an integrated management server that interworks with a managed server having a built-in agent for the sake of integrated management of a variety of management information. The method includes the steps of: collecting, at the agent, in real time, fault information data of the managed server using queues; periodically collecting, at the agent, performance information data of the managed server using a function-specific remote function module (REM); converting, at the agent, the fault and performance information data collected from the managed server into a format that the integrated management server can recognize and transferring it; receiving, at the integrated management server, the fault information data from the agent, and generating and transferring an event message to a corresponding administrator terminal; and receiving, at the integrated management server, the performance information data from the agent and storing it in a previously prepared database (DB). Therefore, even when a user docs not directly access a managed server, fault and performance information data is transferred in real time to the corresponding administrator so that loss due to faults can be minimized.

15 Claims, 4 Drawing Sheets

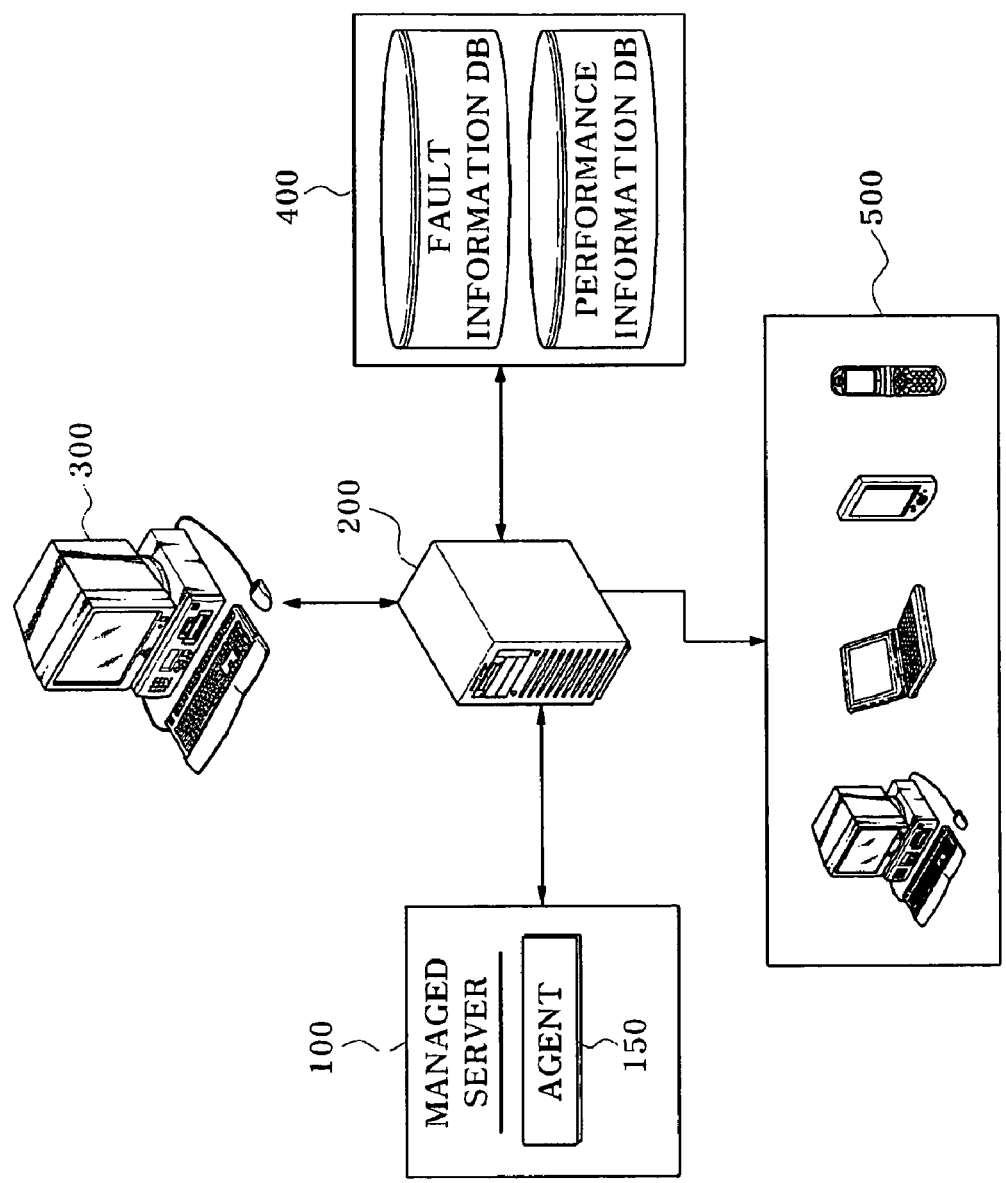

[Fig. 2]
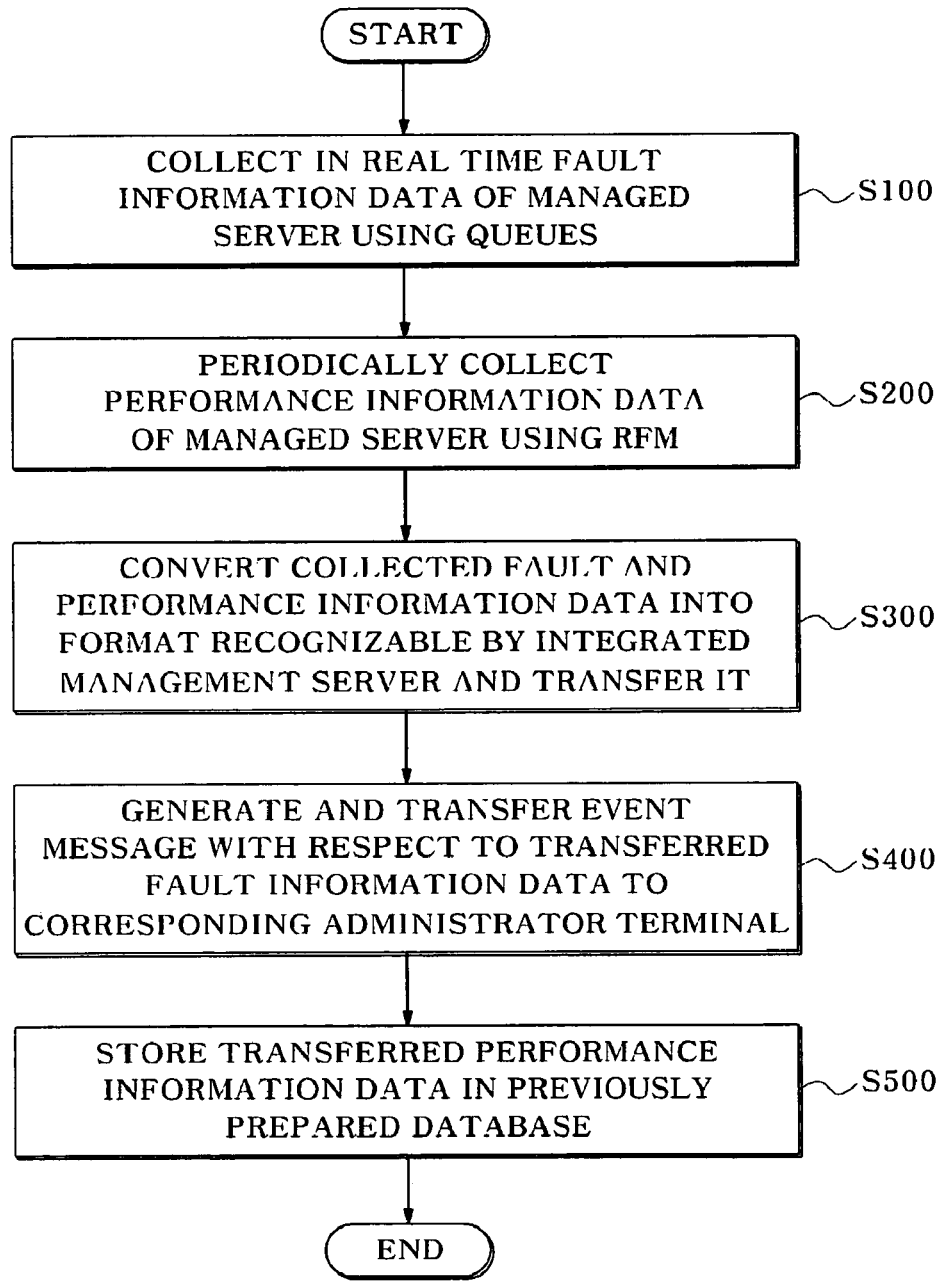

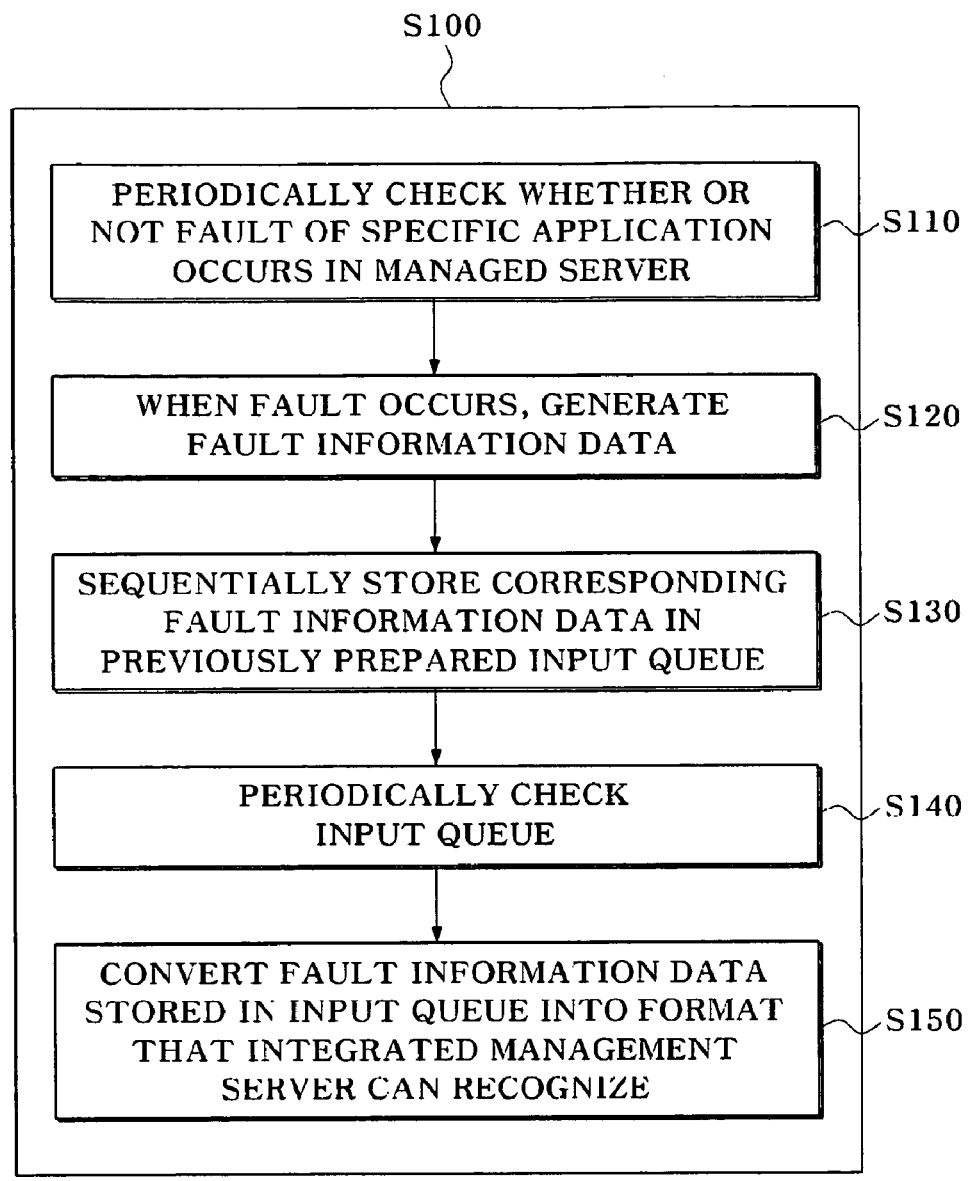

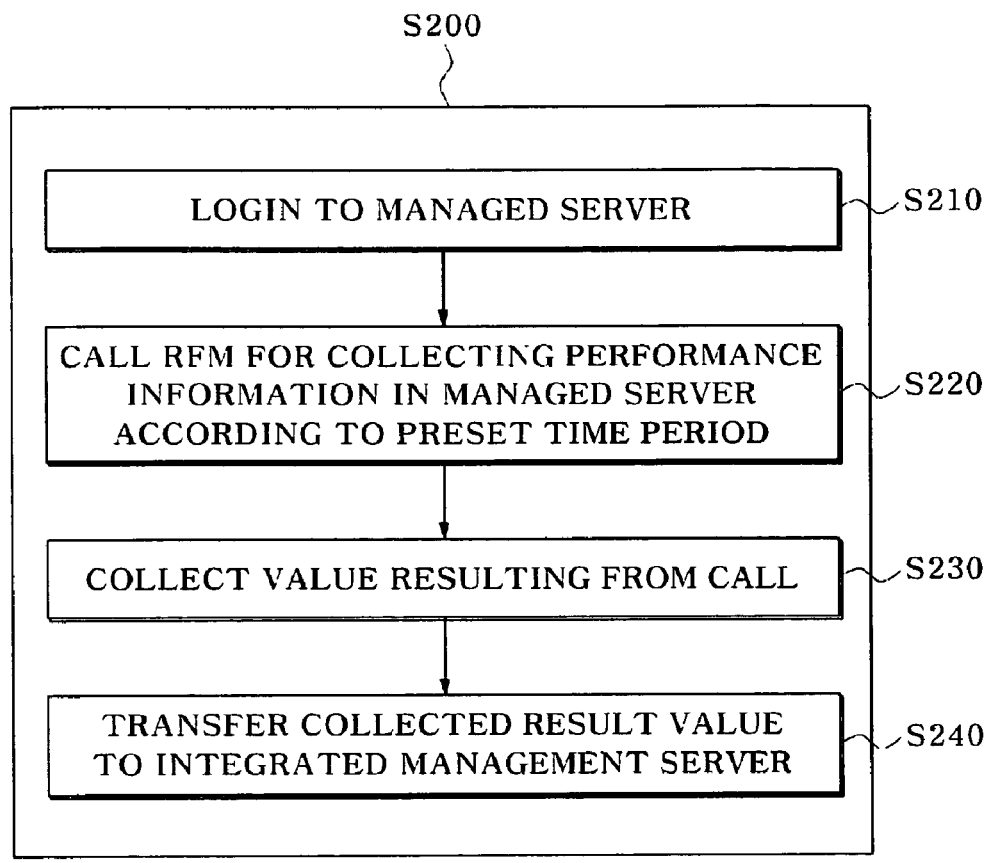

METHOD FOR OBSTRUCTION AND CAPACITY INFORMATION UNIFICATION MONITORING IN UNIFICATION MANAGEMENT SYSTEM ENVIRONMENT AND SYSTEM FOR THEREOF

TECHNICAL FIELD

The present invention relates to a method and system for integrated monitoring of fault and performance information in an integrated management system environment, and more particularly, to a method and system for integrated monitoring of fault and performance information in an integrated management system environment, whereby an integrated management server performs integrated monitoring of fault and performance information data generated from a managed enterprise server, and thus loss due to faults can be minimized.

BACKGROUND ART

In general, an Enterprise Resource Planning (ERP) system, such as R/3 enterprise application developed by SAP AG of Walldorf, Germany, and similar systems developed by PeopleSoft, Oracle, and Baan, is an integrated and packaged large-scale application which fundamentally supports core management functions such as payrolls, manufacturing, general ledgers, human resources, and so on.

Recently, a method and system are required for integrated monitoring of a variety of information, e.g., information on faults, performance, backup, etc., generated in such an ERP system.

DISCLOSURE OF INVENTION

Technical Problem

The present invention is directed to a method and system for integrated monitoring of fault and performance information in an integrated management system environment, whereby an integrated management server performs integrated monitoring of fault and performance information data generated from a managed enterprise server, and thus loss due to faults can be minimized.

Technical Solution

One aspect of the present invention provides a method for integrated monitoring of fault and performance information in a system environment including an integrated management server that interworks with a managed server having a built-in agent for the sake of integrated management of a variety of management information, the method comprising the steps of: (a) collecting, at the agent, in real time, fault information data of the managed server using queues; (b) periodically collecting, at the agent, performance information data of the managed server using a function-specific remote function module (RFM); (c) converting, at the agent, the fault and performance information data collected from the managed server into a format that the integrated management server can recognize and transferring it; (d) receiving, at the integrated management server, the fault information data from the agent, and generating and transferring an event message to a corresponding administrator terminal; and (e) receiving, at the integrated management server, the performance information data from the agent and storing it in a previously prepared database (DB).

In step (a), it may be periodically checked whether or not a fault of a specific application occurs in the managed server, and fault information data generated upon occurrence of a fault may be sequentially stored in an input queue. In addition, in step (c), the agent may periodically check the input queue, convert the fault information data stored in the input queue into a format that the integrated management server can recognize, and transfer it to the integrated management server.

When transfer of the fault information data is completed normally, the agent may sequentially store the fault information data in an output queue and delete the fault information data stored in the output queue after a predetermined time period.

In step (b), after logging in to the managed server, the agent may call the function-specific RFM for collecting the performance information data in the managed server according to a preset time period, and obtain and collect the result value.

The fault information data may include at least one of information of whether or not a batch job is normally performed, intermediate document (TDOC) interface information, and shipment or direct on-board monitoring information.

The performance information data may include at least one of information of whether or not it is possible to login to the managed server, information of the number of users logged in, information of an inner processing and responding rate, and information of an amount of used processes or memory.

In step (d), the generated event message may be transferred to the corresponding administrator terminal in the form of an email or a short message.

In step (d), the generated event message may be stored in another DB.

Another aspect of the present invention provides a recording medium storing a program for executing the above-described method for integrated monitoring of fault and performance information in an integrated management system environment.

Still another aspect of the present invention provides a system for integrated monitoring of fault and performance information in an integrated management system environment, the system comprising: a managed server having a built-in agent for collecting fault and performance information data using queues and a function-specific RFM; an integrated management server interworking with the managed server and performing integrated management on a variety of management information of the managed server; and an administrator console interworking with the integrated management server and performing integrated monitoring of the fault and performance information transferred from the managed server. Here, the agent converts the fault and performance information data collected from the managed server into a format that the integrated management server can recognize and transfers it to the integrated management server. And, the integrated management server receives the fault information data from the agent, and generates and transfers an event message to a corresponding administrator terminal while receiving the performance information data from the agent and storing it in a previously prepared DB.

Here, the managed server may periodically check whether or not a fault of a specific application occurs, and sequentially store fault information data generated upon occurrence of a fault in an input queue. In addition, the agent may periodically check the input queue, convert the fault information data stored in the input queue into a format that the integrated management server can recognize, and transfer it to the integrated management server.

When transfer of the fault information data is completed normally, the agent may sequentially store the fault information data in an output queue and delete the fault information data stored in the output queue after a predetermined time period.

After logging in to the managed server, the agent may call the function-specific RFM for collecting the performance information data in the managed server according to a preset time period, and obtain and collect the result value.

The integrated management server may transfer the generated event message to the corresponding administrator terminal in the form of an email or a short message.

The integrated management server may store the generated event message in another DB.

The managed server may be a SAP server.

The integrated management server may be a Maxigent server.

Advantageous Effects

According to the inventive method and system for integrated monitoring of fault and performance information in an integrated management system environment, an integrated management server performs integrated monitoring of fault and performance information data generated from a managed enterprise server. Consequently, it is possible to minimize loss due to faults and stably operate the managed server.

In addition, according to the present invention, an agent installed in a managed server collects, in real time or periodically, fault and performance information data using queues and a function-specific remote function module (RFM) and transfers it to an integrated management server. Consequently, the corresponding manager can quickly monitor a state of the managed server.

BRIEF DESCRIPTION OF THE DRAWINGS

FIG. 1 is a block diagram of a system for integrated monitoring of fault and performance information in an integrated management system environment according to an exemplary embodiment of the present invention;

FIG. 2 is a flowchart showing a method for integrated monitoring of fault and performance information in an integrated management system environment according to an exemplary embodiment of the present invention;

FIG. 3 is a flowchart showing in detail a fault information data collection process of FIGS. 2; and FIG. 4 is a flowchart showing in detail a performance information data collection process of FIG. 2.

MODE FOR THE INVENTION

Hereinafter, exemplary embodiments of the present invention will be described in detail. However, the present invention is not limited to the exemplary embodiments disclosed below and can be implemented in various modified forms. The present exemplary embodiments are provided to enable one of ordinary skill in the art to embody and practice the invention.

FIG. 1 is a block diagram of a system for integrated monitoring of fault and performance information in an integrated management system environment according to an exemplary embodiment of the present invention.

Referring to FIG. 1, the system for integrated monitoring of fault and performance information in an integrated management system environment according to an exemplary embodiment of the present invention roughly comprises a managed server 100, an integrated management server 200, an administrator console 300, and a database (DB) 400.

Here, the managed server 100 has a built-in agent 150 for collecting fault and performance information data using queues and a function-specific remote function module (RFM).

In addition, the managed server 100 periodically checks whether or not a fault of a specific application occurs, and sequentially stores fault information data generated upon occurrence of a fault in a previously prepared input queue. The agent 150 periodically checks the input queue, converts the fault information data stored in the input queue into a format that the integrated management server 200 can recognize, and transfers it to the integrated management server 200. When transfer of the fault information data is completed normally, the agent 150 sequentially stores the fault information data in a previously prepared output queue and, after a predetermined time period, deletes the fault information data stored in the output queue.

In addition, after logging in to the managed server 100, the agent 150 calls the function-specific RFM for collecting performance information data in the managed server 100 according to a preset time period, and obtains and collects the result value. Also, the agent 150 converts the collected performance information data into a format that the integrated management sever 200 can recognize and transfers it to the integrated management server 200.

The managed server 100 constituted as described above operates in an enterprise resource planning (ERP) system, e.g., SAP R/3, PeopleSoft, Baan, etc., of an enterprise, and covers financial accounting and managerial accounting, production and materials management, quality control and facility maintenance, sales and distribution, personnel management, project management, and so on.

The integrated management server 200 is for performing integrated management on a variety of management information, e.g., fault and performance information, etc., while interworking with the managed server 100. The integrated management server 200 receives the fault information data from the agent 150 installed in the managed server 100, and generates and transfers an event message to a corresponding administrator terminal 500 in the format of, e.g., an email or a short message, or stores it in the DB 400. Also, the integrated management server 200 receives the performance information data from the agent 150 and stores it in the DB 400.

The integrated management server 200 may be implemented as a server managed by an integrated management system, such as Maxigent.

Meanwhile, the administrator terminal 500 employed in an exemplary embodiment of the present invention may be implemented by, e.g., a personal computer (PC), a notebook computer, a cellular phone, a personal digital assistant (PDA), and so on.

The administrator console 300 interworks with the integrated management server 200 and performs integrated monitoring of the fault and performance information data that is transferred from the agent 150 installed in the managed server 100 or stored in the DB 400 using, e.g., a graphic user interface (GUI).

Here, the fault information data may include at least one of, e.g., information of whether or not a reserved operation, i.e., a batch job, is normally performed, intermediate document (IDOC) interface information, and shipment or direct on-board monitoring information.

The performance information data may include at least one of, e.g., information of whether or not it is possible to login to the managed server 100, i.e., by periodic checking of whether or not it is possible to access to a service access point (SAP), information of the number of users logged in, i.e., the number of users simultaneously accessing the SAP, information of an inner processing and responding rate, i.e., total, dialog and batch response times of the SAP, and information of an amount of used processes, i.e., the number of processes, such as dialog, batch (BTC), etc., that are being used by the SAP, or information of an amount of used memory, i.e., the current status of roll and page used by the SAP, etc.

Meanwhile, in addition to the administrator console 300, a web console (not shown in the drawings) may be further included so that an administrator can remotely perform integrated monitoring of the fault and performance information data transferred from the agent 150 using the Internet.

FIG. 2 is a flowchart showing a method for integrated monitoring of fault and performance information in an integrated management system environment according to an exemplary embodiment of the present invention. FIG. 3 is a flowchart showing in detail a fault information data collection process of FIG. 2. FIG. 4 is a flowchart showing in detail a performance information data collection process of FIG. 2.

Referring to FIGS. 2 to 4, first, the agent 150 (see FIG. 1) installed in the managed server 100 (see FIG. 1) collects, in real time, fault information data of the managed server 100 using queues (step 100), and also periodically collects performance information data of the managed server 100 using a function-specific RFM (step 200).

Subsequently, the agent 150 converts the fault and performance information data collected from the managed server 100 into a format that the integrated management server 200 (see FIG. 1) can recognize, and transfers it to the integrated management server 200 (step 300).

Subsequently, the integrated management server 200 receives the fault information data from the agent 150, and generates and transfers an event message to the corresponding administrator terminal 500 (see FIG. 1) in the form of, e.g., an email or a short message (step 400). Meanwhile, the generated event message may be stored in the separate DB 400 (see FIG. 1).

In addition, the integrated management server 200 receives the performance information data from the agent 150 and stores it in the DB 400 (step 500).

Step 100 of collecting fault information data will be described in detail with reference to FIG. 3. It is periodically checked whether or not a fault of a specific application occurs in the managed server 100 (step 110). When a fault occurs, a fault occurrence reason message, i.e., fault information data, is generated (step 120), and the fault information data is sequentially stored in a previously prepared input queue (step 130).

Subsequently, the agent 150 periodically checks the input queue (step 140). Then, the agent 150 converts the fault information data stored in the input queue into a format that the integrated management server 200 can recognize, and transfers it to the integrated management server 200 (step 150).

When transfer of the fault information data is completed normally, the agent 150 sequentially stores the fault information data in a previously prepared output queue and, after a predetermined time period, deletes the fault information data stored in the output queue.

When a failure occurs in a network between a managed server in, e.g., a SAP R/3 system and an integrated management server such as Maxigent, it is checked by collecting fault information data as described above whether or not the SAP R/3 system transfers fault occurrence data. Thus, the fault occurrence data is not lost. In addition, since logic can be implemented in an advanced business application programming (ABAP) program, which is SAP s development support program providing a powerful fourth generation language (4GL) of SAP itself, provided as a base tool integrating a testing tool, a monitoring tool, etc., and thereby enabling a developer to provide a reliable information system in a short time period, it is unnecessary to periodically monitor a SAP system, that is, it is possible to actively check an event.

Step 200 of collecting performance information data will be described in detail with reference to FIG. 4. After logging in to the managed server 100 (step 210), the agent 150 calls a function-specific RFM for collecting performance information data in the managed server 100 according to a preset time period (step 220). Subsequently, the agent 150 obtains and collects the result value (step 230), and then transfers it to the integrated management server 200 (step 240).

In other words, while running as a daemon in the managed server 100, the agent 150 calls the corresponding RFM according to the set time period and transfers the result value to the integrated management server 200.

Meanwhile, the method for integrated monitoring of fault and performance information in an integrated management system environment according to an exemplary embodiment of the present invention can be stored on a computer-readable recording medium in the form of computer code. The computer-readable recording medium may be any recording device storing data that can be read by computer systems.

For example, the computer-readable recording medium may be a read-only memory (ROM), a random-access memory (RAM), a compact disk read-only memory (CD-ROM), a magnetic tape, a hard disk, a floppy disk, a mobile storage device, a non-volatile memory such as flash memory, an optical data storage device, and so on. Also, the recording medium may be carrier waves, e.g., transmission over the Internet.

In addition, the computer-readable recording medium may be distributed among computer systems connected via a communication network and stored and executed as a code that can be read by a de-centralized method.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method for integrated monitoring of fault and performance information in an integrated management system environment including an integrated management server interworking with a managed server having a built-in agent for the sake of integrated management of a variety of management information, the method comprising the steps of:
   (a) collecting, at the agent, in real time, fault information data of the managed server using queues, wherein the agent periodically checks whether or not a fault of a specific application occurs in the managed server, and fault information data generated upon occurrence of a fault is sequentially stored in an input queue;
   (b) periodically collecting, at the agent, performance information data of the managed server using a function-specific remote function module (RFM);
   (c) converting, at the agent, the fault and performance information data collected from the managed server into a format recognizable by the integrated management server, and transferring the fault and performance information data, wherein the agent periodically checks the input queue, converts the fault information data stored in the input queue into a format recognizable by the integrated management server and transfers the fault information data to the integrated management server;

(d) receiving, at the integrated management server, the fault information data from the agent, and generating and transferring an event message to a corresponding administrator terminal; and (e) receiving, at the integrated management server, the performance information data from the agent and storing the performance information data in a previously prepared database (DB);

wherein when transfer of the fault information data is completed normally, the agent sequentially stores the fault information data in an output queue and, after a predetermined time period, deletes the fault information data stored in the output queue.

2. The method according to claim 1, wherein in step (b), the agent calls the function-specific RFM for collecting the performance information data in the managed server according to a preset time period, and obtains and collects the result value.

3. The method according to claim 1, wherein the fault information data includes at least one of information of whether or not a batch job is normally performed, intermediate document (IDOC) interface information, and shipment or direct onboard monitoring information.

4. The method according to claim 1, wherein the performance information data includes at least one of information of whether or not it is possible to login to the managed server, information of a number of users logged in, information of an inner processing and responding rate, and information of an amount of used processes or memory.

5. The method according to claim 1, wherein in step (d), the generated event message is transferred to the corresponding administrator terminal in the form of an email or a short message.

6. The method according to claim 1, wherein in step (d), the generated event message is stored in another DB.

7. A non-transitory computer-readable recording media storing a program capable of implementing the method according to claim 1.

8. A system for integrated monitoring of fault and performance information in an integrated management system environment, the system comprising:

a managed server having a built-in agent for collecting fault and performance information data using queues and a function-specific remote function module (RFM);

an integrated management server interworking with the managed server and performing integrated management on a variety of management information of the managed server; and an administrator console interworking with the integrated management server and performing integrated monitoring of the fault and performance information transferred from the managed server, wherein the agent converts the fault and performance information data collected from the managed server into a format recognizable by the integrated management server and transfers the fault and performance information data to the integrated management server, and the integrated management server receives the fault information data from the agent and generates and transfers an event message to a corresponding administrator terminal while receiving the performance information data from the agent and storing the performance information data in a previously prepared database (DB), wherein the managed server periodically checks whether or not a fault of a specific application occurs, and sequentially stores fault information data generated upon occurrence of a fault in an input queue, and the agent periodically checks the input queue, converts the fault information data stored in the input queue into a format recognizable by the integrated management server, and transfers the fault information data to the integrated management server, and wherein transfer of the fault information data is completed normally, the agent sequentially stores the fault information data in an output queue and, after a predetermined time period, deletes the fault information data stored in the output queue.

9. The system according to claim 8, wherein the agent calls the function-specific RFM for collecting the performance information data in the managed server according to a preset time period, and obtains and collects the result value.

10. The system according to claim 8, wherein the fault information data includes at least one of information of whether or not a batch job is normally performed, intermediate document (IDOC) interface information, and shipment or direct onboard monitoring information.

11. The system according to claim 8, wherein the performance information data includes at least one of information of whether or not it is possible to login to the managed server, information of a number of users logged in, information of an inner processing and responding rate, and information of an amount of used processes or memory.

12. The system according to claim 8, wherein the integrated management server transfers the generated event message to the corresponding administrator terminal in the form of an email or a short message.

13. The system according to claim 8, wherein the integrated management server stores the generated event message in another DB.

14. The system according to claim 8, wherein the managed server is a SAP server.

15. A system for integrated monitoring of fault and performance information in an integrated management system environment, the system comprising:

a managed server having a built-in agent for collecting fault and performance information data using queues and a function-specific remote function module (RFM);

an integrated management server interworking with the managed server and performing integrated management on a variety of management information of the managed server; and an administrator console interworking with the integrated management server and performing integrated monitoring of the fault and performance information transferred from the managed server, wherein the agent converts the fault and performance information data collected from the managed server into a format recognizable by the integrated management server and transfers the fault and performance information data to the integrated management server, and the integrated management server receives the fault information data from the agent and generates and transfers an event message to a corresponding administrator terminal while receiving the performance information data from the agent and storing the performance information data in a previously prepared database (DB), and wherein the integrated management server is a Maxigent server.

* * * * *